(12) United States Patent
Neustein et al.

(10) Patent No.: US 10,860,821 B1
(45) Date of Patent: Dec. 8, 2020

(54) BARCODE DISAMBIGUATION

(71) Applicant: A9.com, Inc., Palo Alto, CA (US)

(72) Inventors: Adam Moshe Neustein, San Francisco, CA (US); William Brendel, San Francisco, CA (US); Pinkee Rasik Patel Gupta, San Mateo, CA (US); Zur Nehushtan, Mountain View, CA (US); Sean Niu, San Francisco, CA (US); Shruti Sheorey, Mountain View, CA (US); Sunil Ramesh, San Jose, CA (US)

(73) Assignee: A9.com, Inc., Palo Alto, CA (US)

( * ) Notice: Subject to any disclaimer, the term of this patent is extended or adjusted under 35 U.S.C. 154(b) by 407 days.

(21) Appl. No.: 15/139,080

(22) Filed: Apr. 26, 2016

(51) Int. Cl.
*G06F 16/30* (2019.01)
*G06K 7/10* (2006.01)
*G06F 16/583* (2019.01)

(52) U.S. Cl.
CPC ..... *G06K 7/10821* (2013.01); *G06F 16/5854* (2019.01)

(58) Field of Classification Search
CPC .......... G06K 7/10821; G06F 17/30259; G06F 16/5854
USPC ....................................................... 707/769
See application file for complete search history.

(56) References Cited

U.S. PATENT DOCUMENTS

| | | | | |
|---|---|---|---|---|
| 7,406,214 B2 * | 7/2008 | Rhoads | ................... | G06F 3/017 382/289 |
| 7,788,271 B2 * | 8/2010 | Soma | ................... | G06Q 20/401 707/758 |
| 8,370,373 B2 * | 2/2013 | Yamamoto | .............. | G06F 16/93 707/758 |
| 9,177,225 B1 * | 11/2015 | Cordova-Diba | ... | G06K 9/00671 |
| 9,492,923 B2 * | 11/2016 | Wellman | ............... | G06Q 10/087 |
| 9,900,166 B2 * | 2/2018 | Luby | ....................... | H04L 65/00 |
| 9,971,784 B2 * | 5/2018 | Gokhale | .................. | G06F 16/00 |
| 2002/0159627 A1 * | 10/2002 | Schneiderman | ..... | G06K 9/3241 382/154 |
| 2013/0044129 A1 * | 2/2013 | Latta | ....................... | G06F 3/011 345/633 |

* cited by examiner

*Primary Examiner* — Kuen S Lu
(74) *Attorney, Agent, or Firm* — Hogan Lovells US LLP

(57) ABSTRACT

Because not all companies register or obtain barcodes (or other encodings or identifiers) from a single, consistent source, and because different companies can be associated with the same barcode at different times, there can be multiple products associated with a specific barcode. If a user requests information associated with a specific barcode, information associated with the user or request can be used to attempt to determine the associated product if more than one matching product is uncovered. In some embodiments, a location of a user device at approximately a time of the request can be used to attempt to determine the appropriate product, such as if the user is in a store that only offers one of the potential products. Other information can be used as well, such as past locations, purchase history, viewing patterns, and the like.

20 Claims, 8 Drawing Sheets

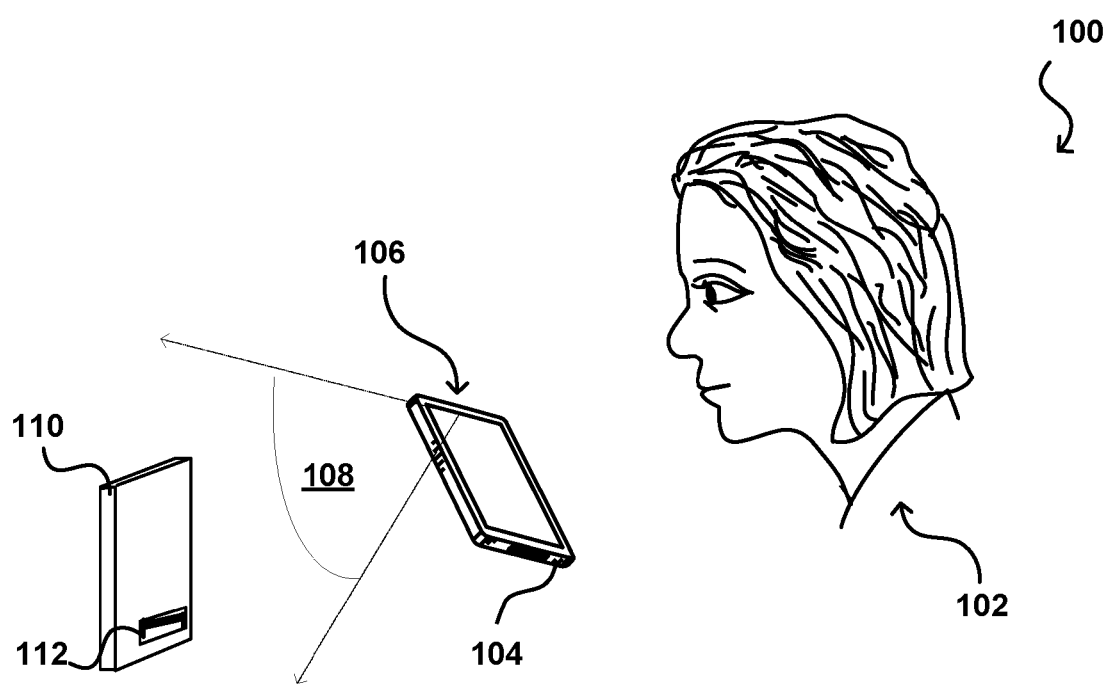
FIG. 1A
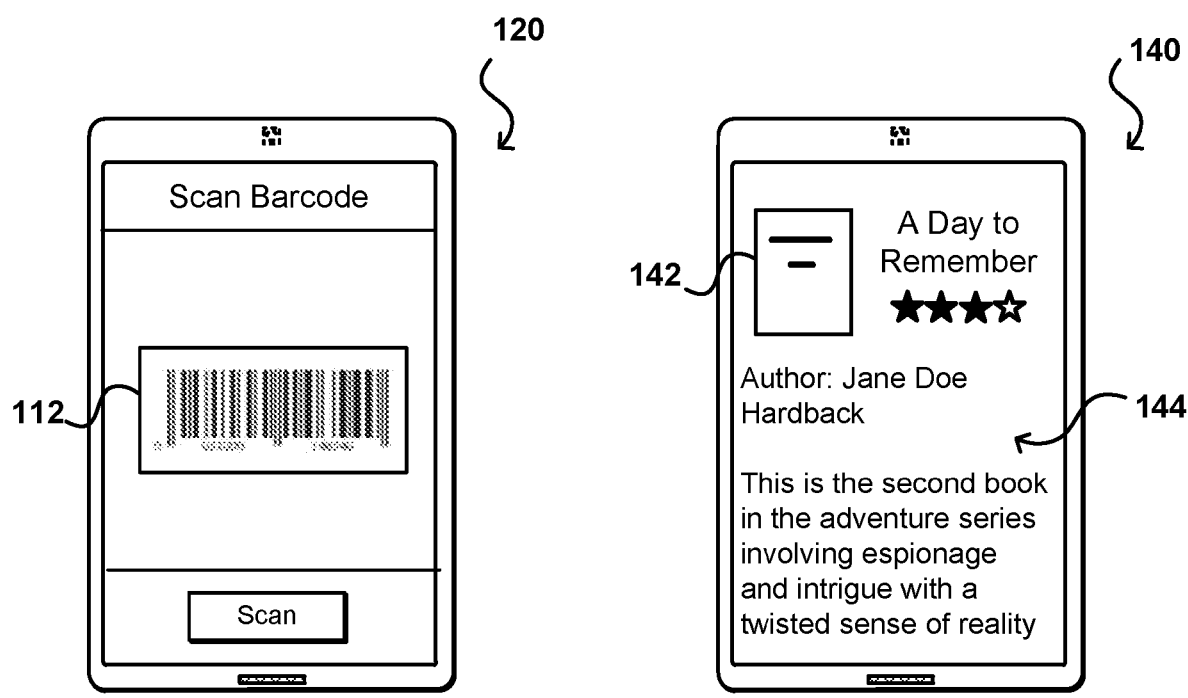
FIG. 1B
FIG. 1C

BARCODE DISAMBIGUATION

BACKGROUND

Users have become accustomed to using portable computing devices to perform various tasks and to obtain a wide variety of information. For example, a user can use a camera of a smart phone to capture an image of an item of interest, and information about that item can be displayed to the user via the device. In one approach, an image can include a representation of a barcode on the item or item packaging, and the barcode information used to identify the item of interest. Not all sources of items license barcode information from a common source, however, and some owners of a barcode can sell use of that barcode to another entity. As a result, there can be two or more items that use, or have used, the same barcode. This prevents information from accurately being determined for barcodes in many instances.

BRIEF DESCRIPTION OF THE DRAWINGS

Various embodiments in accordance with the present disclosure will be described with reference to the drawings, in which:

FIGS. 1A, 1B, and 1C illustrate an example situation where barcode data represented in an image captured by a client device can be used to cause information about the corresponding product to be displayed on the client device in accordance with various embodiments.

DETAILED DESCRIPTION

Figure 2:
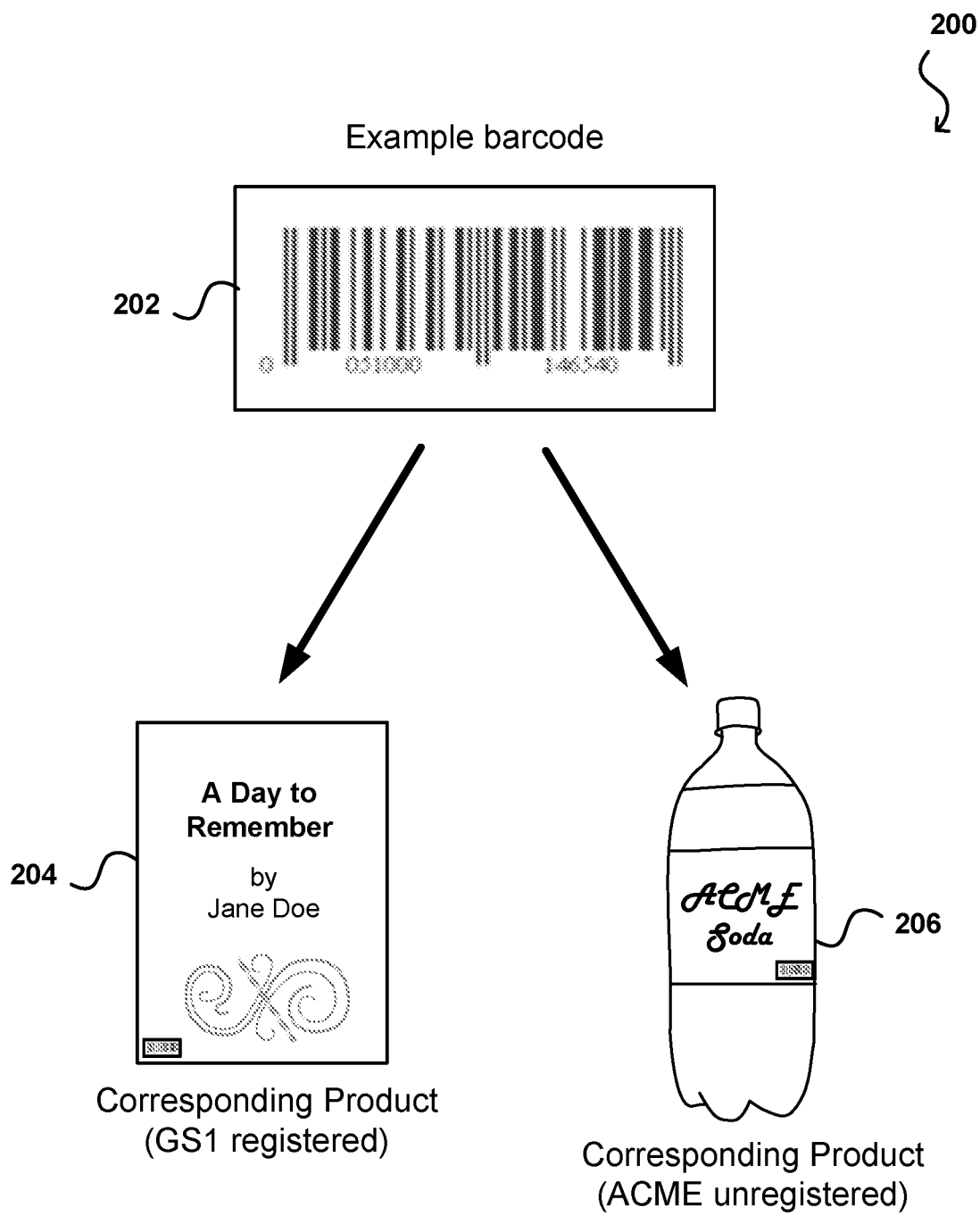
FIG. 2 illustrates an example situation wherein barcode data corresponds to two different items from two different sources that can be determined in accordance with various embodiments.

Systems and methods in accordance with various embodiments of the present disclosure may overcome one or more of the aforementioned and other deficiencies experienced in conventional approaches to locating and/or obtaining content. In particular, various embodiments utilize additional information to attempt to identify an object of interest when more than one item matches an identifier or identifying content, such as a barcode, QR code, identifier product packaging, and the like.

In some embodiments an image might be captured by a camera of a computing device, where that image includes a representation of a barcode of an object of interest. The image can be analyzed, on the client device or a remote system, to locate the barcode and determine the encoded product identifier. The identifier can then be used to search one or more data sources to identify a matching object. Because not all companies utilize the same barcode assignment system, and because objects associated with a barcode can change over time, there can be information for multiple objects returned from the search. In order to attempt to determine the appropriate object of interest corresponding to the request or image, additional information can be used to attempt to improve the relative confidence score for each potential object. In various examples, position information can be used to improve the confidence scores. If the uploading device is in a store that sells only one of the potential objects, then that object can be determined to correspond to the barcode with high confidence. If there is no store in the nearby area that sells one of the objects, then it can be less likely that object corresponds to the barcode. Various other types of information can be used as well. For example, the user's past location history, purchase history, viewing history, user profile, and other such information can be used to attempt to determine, with at least some level of confidence, which item corresponds to the barcode represented in the query image.

Various other applications, processes and uses are presented below with respect to the various embodiments.

FIG. 1A illustrates an example environment 100 in which a client device 104 is being operated by a user 102. Although a portable computing device (e.g., a smart phone or tablet computer) is illustrated, it should be understood that a variety of other types of client devices can be utilized as well, as may include notebook computers, smart TVs, desktop computers, set top boxes, wearable computers (e.g., glasses, watches, or contacts), and other such devices. In this example, a camera 106 of the client device is being positioned such that an item or object of interest 110 is contained within a field of view 108 of the camera. In many instances a near live view of the captured image data can be displayed on a display screen of the computing device 104 such that the user 102 can ensure that the item of interest 112 is represented in the captured image data. In this example the user 102 is interested in obtaining information about the item of interest. Accordingly, the user can cause data representative of the item to be captured by the camera 106 of the computing device. While certain approaches enable data such as a title, brand name, or logo to be captured and analyzed, in this example the image data to be captured includes a representation of a barcode 112 displayed on the item or interest, or packaging of the item of interest, among other such options.

FIG. 1B illustrates an example presentation 120 of content wherein image data captured using the camera is displayed on a display screen of the computing device. As illustrated, the representation of the barcode 112 is contained within the captured image data based on the relative orientation of the camera to the item of interest. The user can adjust the orientation, zoom, focus, and/or other such aspects in order to attempt to capture a clear, focused image of the barcode that is relatively horizontal (in this example) and occupies a significant portion of the display screen, in order to enable a relatively accurate representation of the barcode to be captured that can be accurately analyzed. When the user is satisfied with the representation of the barcode in the image data as displayed, the user can select an option to cause the image to be captured or otherwise selected for analysis. In some embodiments an image analysis process on the computing device will attempt to recognize a barcode pattern and determine when the barcode is in sufficient focus or otherwise represented with sufficient clarity or image quality, for example, and can automatically capture or select an image frame, among other such options.

Once an image or image frame is selected for analysis, that image frame can be analyzed on the device or uploaded to a remote analysis service, among other such options. As part of the analysis, the image data can be analyzed using one or more algorithms to attempt to locate the representation of the barcode in the image data. These algorithms can include, for example, pattern matching, feature detection, image recognition, object detection, and other such algorithms as known or used in the art for locating specific types of objects or content represented in image data. In one embodiment, the image will be analyzed to determine the location and/or alignment of a barcode pattern in the image data. A barcode analyzer, OCR engine, and/or other such process can then analyze that portion of the image data to attempt to determine the identifier or code encoded in the barcode. This can include, for example, a character string of a determined length and/or format, which is associated with a specific item, product, or other such object. As there can be various types of barcodes and other encodings, as may include QR codes, watermarks, and others, there can be different types of image analysis algorithms used to attempt to recognize the encoding and determine the corresponding identifier. For purposes of discussion, the string encoded in the encoding, which can include letters, numbers, or an assortment of alphanumeric characters, will be referred to herein as an identifier.

Once an identifier is determined from a barcode, that identifier can be used to identify the corresponding object. In the example situation 140 of FIG. 1C, the identifier was determined to correspond to a specific edition of a book. Once identified, information such as an image 142 of the book and associated information 144 can be located and provided for display on the computing device. Various other types of information or content can be located and presented as well within the scope of the various embodiments. In this example, the identifier can be used to search through an electronic catalog, or other data repository, that includes listings of objects and their associated identifiers. This repository can be maintained by a provider of the interface or application from which the content is displayed, or can be provided by a third party. In at least some embodiments, a designated third party might issue specific barcodes, or barcode identifiers, for specific objects in order to enable various other parties to determine the object associated with a barcode. This can be useful in locations such as physical stores, where a scanning process might utilize the barcode to identify the product for purposes of pricing or inclusion in a transaction, among other such options.

As mentioned, there can be various types of encodings used to identify specific objects, or types of objects (i.e., watermelons from a specific source). A barcode is a specific example used for discussion purposes, but various other encodings can take advantage of aspects of the various embodiments as well as discussed and suggested herein. A barcode in general is an optical machine-readable encoding that includes a set of parallel lines of determined relative length, where the relative widths and/or spacings of the lines determine the identifier encoded therein. A barcode also will often include the actual alphanumerical characters for the identifier in order to make the barcode also have a human-readable aspect. The use of the parallel lines enables the code to be read by a linear scanner, such as an optical bar scanner, where the relative widths can be read even if the scanner is positioned at an angle with respect to the barcode.

Various entities can issue barcodes for specific products and/or regulate how barcodes are to be presented. For example, a universal product code (UPC) is often used to identify products offered for consumption through a marketplace, whether physical or electronic. A company such as GS1 can enable a customer to "lease" a UPC code, for example, and maintain exclusive use of that UPC code as long as renewal fees are paid for the code. If a renewal fee is not paid, that code then becomes available for another entity. Other companies do not require renewal or enable codes to be assigned to different entities at different times, and there are various other approaches for registering, leasing, or purchasing a barcode or UPC code as well.

Problems can arise when, for example, a first entity does not pay the renewal fee for a barcode and a second entity then obtains the rights to that code. A party obtaining the code may not be able to determine with any certainty whether the code was received for a first product, offered by the first entity, or a second product, offered by the second entity, where that code was associated with each product at a different time. As mentioned, sometimes an entity can also sell a set of codes that are no longer being used, or sublease codes for a period of time, among other such options.

It can also be the case, for example, that an entity chooses not to pay for a specific set of barcodes and instead generates its own barcodes and identifiers. For example, a grocery store that sells its own products might generate its own identifiers for its own products, and maintain the associations in a data repository specifically used for that entity. While such usage may have cost advantages while in an environment associated with that entity, it can lead to confusion in other environments. For example, a customer having purchased an item from that entity might scan the barcode at home to attempt to determine information about that item, such as nutritional information, related items, current pricing and availability, and the like. If the request is received to a provider other than the entity from which the item was purchased, the provider may be unable to determine the item associated with the request as there may be more than one item associated with that code.

FIG. 2 illustrates an example situation 200 corresponding to the above-mentioned problem. Here, there is a barcode 202 with a specific identifier ("051000 146540") encoded. The barcode is registered with an entity such as GS1 for a first product 204, here a book, offered from a first source. Entities searching for information relating to that barcode would likely search a GS1 (or similar) repository and obtain information associated with the book 204. In this example, however, there is also a second source (here "ACME") that uses their own barcodes for their own products. Accordingly, ACME has the barcode 202 associated with a different product 206, here a bottle of soda. An entity looking specifically for information from an ACME data repository then would uncover information about the second product 206. For an external entity with access to data from both repositories, a request received with just the barcode or barcode identifier would find results associated with both products, and it would be difficult to determine which product is actually of interest or otherwise associated with the request.

Accordingly, approaches in accordance with various embodiments can attempt to obtain or utilize additional information that is indicative of the object that is likely associated with the request indicating a specific barcode. This can include, for example, information associated with the request, a device submitting the request, a user associated with the request, a location from which the request is received, and other such information.

Figure 3:
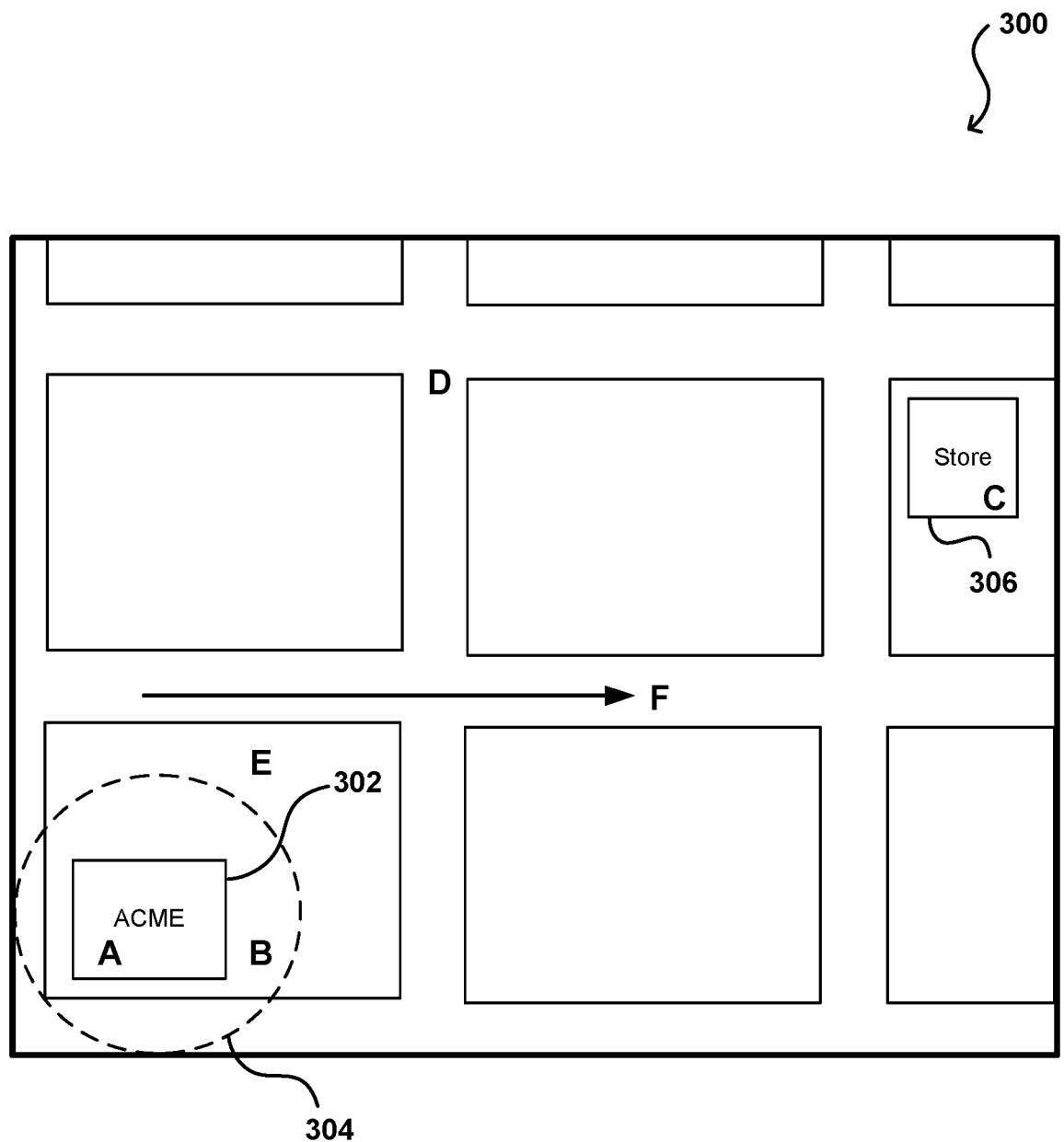
FIG. 3 illustrates example locations that can be used to determine the likelihood of a particular product corresponding to a barcode in accordance with various embodiments.

For example, FIG. 3 illustrates an example overview 300 of a geographic region from which request can be received. In this example there is a first store 302 associated with the ACME company, and a second, general store 306 that offers items from multiple sources. The ACME company in this example utilizes its own barcodes, while products offered through the general store 306 generally utilize UPC barcodes that are registered with the appropriate entities. A first product from the first store 302 and a second product from the second store 304 might have the same barcode applied. An entity receiving a request including barcode data can utilize position data in such a situation to attempt to determine, with some level of confidence, the item that is associated with the request.

An entity receiving a request can determine the barcode identifier using approaches discussed and suggested herein. Once the identifier is obtained, the entity can perform a lookup against at least one appropriate data source to determine the corresponding object. Some entities, such as providers of an electronic marketplace selling items from multiple sources, might utilize a data repository that includes information for both ACME and other UPC-utilizing companies. Such an entity can obtain information from additional sources as well, such as by crawling information sources or accepting information from users, among other such options. Such an entity might instead query multiple data sources to obtain such information. Using these or other arrangements, the entity might receive information for multiple objects that are associated with the barcode, either at the current time or at some time in the past, etc.

If the request is received from a mobile device, such as a smartphone, tablet computer, smart watch, or other such device, there might be position data associated with the request. For example, metadata for the request might include coordinate information indicating a location of the device at approximately the time the request was sent. The entity can then use this data to attempt to determine which object more likely corresponds to the request. For example, if the position data corresponds to position A in the figure, the entity might be able to determine that the request was sent from within an ACME store. In such an instance, a user might be looking for reviews, nutritional data, or other such information. If it can be determined, based at least in part upon the position data, that the request was sent from within an ACME store, then it can be determined with relatively high certainty that the ACME object associated with the barcode in the request is the object of interest for the request. Thus, information returned to the device can correspond to the ACME product. If, however, the position information indicates that the request was sent from position C, which is inside a second store 306 that does not sell ACME items, then it might be determined with relative confidence that the object is the UPC-registered object and not the ACME object.

Positions outside those stores can still be indicative of a particular product, but might generate less confident determinations. For example, position B is outside the ACME store but within a region 304 defined by a radial distance from a center point of the ACME store. Various other shaped or sized regions can be used as well. Within this region, which might correspond to a parking lot or plaza, for example, it might still be determined with relatively high confidence that the product of interest is the ACME product.

As the position starts to move away from the ACME store 302, however, the confidence that the product is the ACME product can decrease. For example, position E is nearer to the ACME store 302 than to the general store 306, such that it might be at least somewhat likely that the product is an ACME product. The confidence can depend upon factors such as the distance between the stores, other stores nearby, etc. It at least some embodiments, there must be an ACME store within a specified geographic region or a device (or other device associated with a user) must have been within a specified distance of an ACME store within a recent period of time in order for the ACME product to be considered as an option for the barcode. For example, the device might have followed a path F that with near an ACME store 304. If information is available indicating whether the device has ever been in an ACME store then that can increase the confidence, but if the path has taken the device near an ACME store, such as where someone with the user might have gone in the store or the user might have left the device in the car, etc., then the ACME object can be associated with the barcode with at least some level of confidence. The closer the position is to the ACME store and the more recent, in at least some embodiments, the higher the confidence level that the object corresponding to the barcode is the ACME product.

If the request was received from a position such as position D, various approaches can be used to determine the respective objects and confidence levels. For example, a position-only based approach might determine that the position is relatively equidistant between the ACME store 302 and the general store 306, such that the products are equally likely to correspond to the received barcode data. In this case, however, the ACME barcode encodes an identifier that is only associated with ACME products and there are many other stores nearby that sell UPC-compliant products, such that even though the distance might be roughly equal there is a higher likelihood that the object of interest corresponds to the UPC-compliant object. In at least some embodiments, unless there is at least some evidence that the object might be an ACME object with at least a minimum level of confidence, the default result of a UPC-compliant object might always be provided. If, for example, the request was received from position D but the device was recently at, or sufficiently near, position A, then it is possible that the object is an ACME object. Thus, historical location information can be used as well in at least some embodiments, with more recent detection at that location resulting in a higher confidence score in an ACME product. The type of object might also be considered as well. For example, if the ACME object has an expiration time of a week after purchase and the device was in an ACME store over a year ago, then the barcode likely does not correspond to the ACME object.

The position of a device can be determined in a number of different ways. As mentioned, in some embodiments the position information (i.e., geographic coordinates) might be included as metadata with a request. In other embodiments a separate request might be sent to the device for position information, among other such options. Position information can be determined in some embodiments by using GPS data provided using a GPS sub-system on the computing device. Other approaches for location determination can be used as well, such as may be based upon cell tower triangulation, Wi-Fi connection, Bluetooth connections, network connections, and the like. For example, if it can be determined that the device is connected to an ACME wireless network then the location of the device inside an ACME store can be determined.

Figure 4:
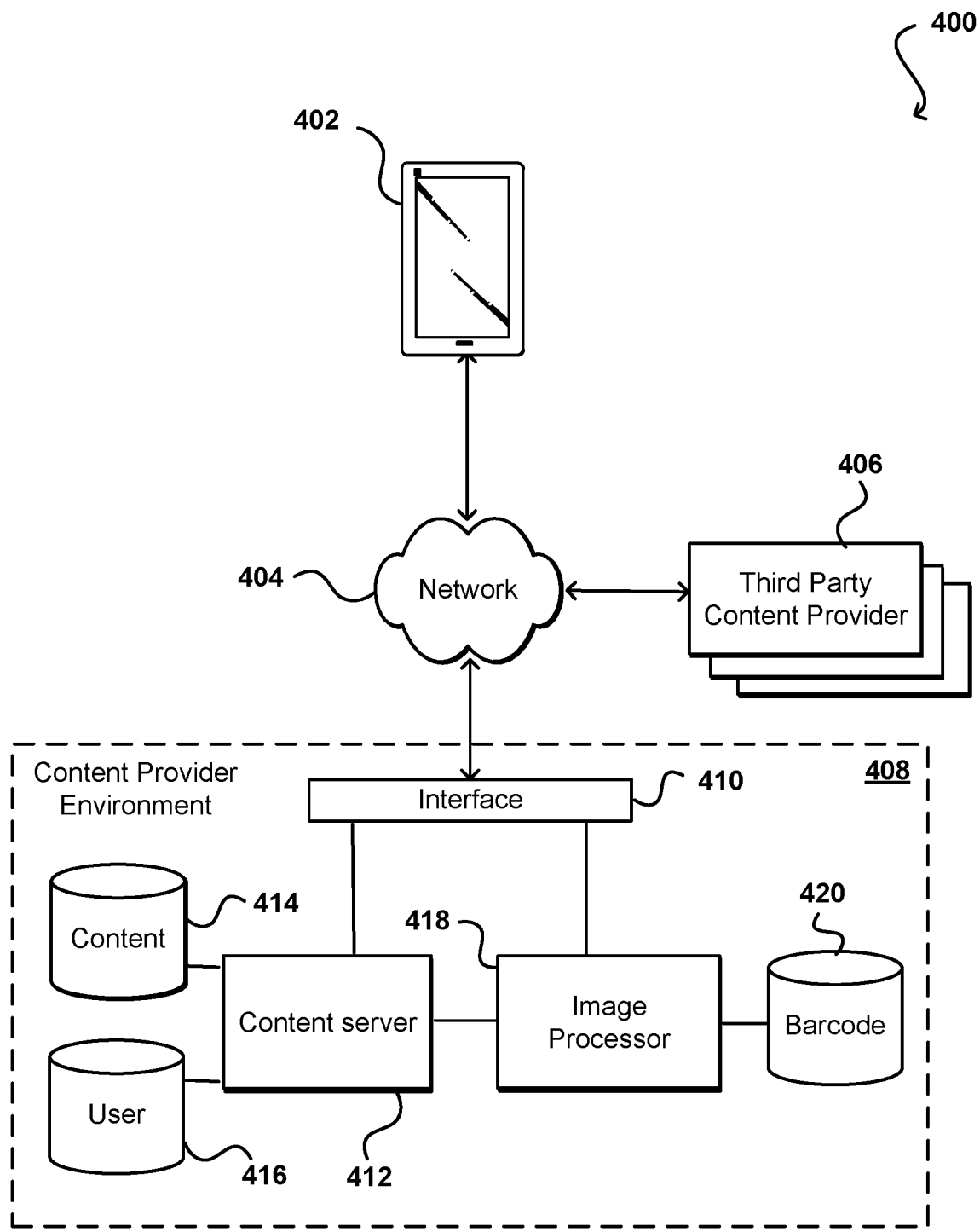
FIG. 4 illustrates an example system that can be used to provide information for an item corresponding to a barcode that can be used in accordance with various embodiments.

FIG. 4 illustrates an example environment 400 that can be used to implement aspects in accordance with various embodiments. In FIG. 4, a client computing device 402 can submit a request for content across at least one network 404 to be received by a content provider environment 408. As mentioned, in at least some embodiments the request can include barcode data, whether in the form of an image including a representation of a barcode, a barcode identifier determined from such image data, or otherwise. The network(s) can include any appropriate network, such as the Internet, a local area network (LAN), a cellular network, an Ethernet, or other such wired and/or wireless network. The content provider environment 408 can include any appropriate resources for providing content from a resource provider, as may include various servers, data stores, and other such components known or used for providing content from across a network (or from the "cloud").

In this example, a call received to the content provider environment 408 can be received by an interface layer 410 of the environment. As known for network environments, the interface layer can include components such as interfaces (e.g., APIs), load balancers, request and/or data routers, and the like. If the request is a request for content, such as for content for a page to be displayed in an application (e.g., browser) that includes information corresponding to a product associated with a barcode, information for the request can be directed to one or more content servers 412, which can obtain the content from a content data store 414 or other such repository to be sent back across the network(s) to the computing device. In some embodiments, information for the request might also be compared against user data in a user data store 416 or other such location to determine, for example, whether the user has access rights to that content. In one example, the content can include a plurality of images to be displayed as part of a set of search results, although various other types of content and uses for images can be utilized as well within the scope of the various embodiments. As mentioned, the content can correspond to one or more objects associated with a barcode identifier in at least some embodiments.

In some cases, a call or request received to the content provider environment 408 might be from another entity, such as a third party content provider 406. As discussed previously, such providers may provide images and information to be displayed to users along with the served content. This content may relate to a specific item, product, or other such object associated with a product. The content may also include barcode information, whereby barcode identifiers can be associated with certain objects. In some embodiments the content provider network will call into such a third party system for the content.

The interface layer can determine the type of call or request and cause information to be forwarded to the appropriate component or sub-system. For example, barcode data can be forwarded to a barcode data repository 420, and the associated object content forwarded to a content repository 414. When a request for information, including an image with barcode data, is received, that image can be forwarded to an image processor 418 or other such component, which in some embodiments can cause the images to be stored at least temporarily. Since it may be desirable to manipulate at least some of the images before analysis, as discussed herein, the image processor can process at least some of the images before causing those images to be analyzed and/or stored in the content repository 414.

The image processing component, system, or service 418 can analyze images using approaches discussed herein to determine the presence of barcodes or other such encodings. The images, or image data, can be analyzed for specific encoding patterns, and then those pattern portions analyzed to extract the identifier from the encoding. The identifier can then be compared against the data in the barcode repository 420 to determine the matching objects. Information for those objects, such as object identifiers, can then be provided to the content server 412 in order to locate the appropriate content for the object identifier(s) and provide that content for display on the client device 402.

In some cases, a barcode imaging process might not provide acceptable results due at least in part to some aspect of the barcode and/or captured image. In at least some embodiments, the matching process can include one or more variations or additional steps to attempt to find a match while accounting for a number of potential aspects or issues with the captured information. For example, the recognition and/or analysis process might perform additional steps to attempt to handle other barcode formats, such as UPC-E or EAN-8. The process also might attempt to correct for any noise in a central set of rows or other portions of the image, such as where there were specular reflections in the captured image. In UPC codes, or other encodings, where an initial portion of the identifier corresponds to the owner or domain, an ability to determine that portion with confidence can at least enable results to be filtered to those products offered from that source or entity.

In some embodiments, other information included in the image data and/or request can be analyzed to attempt to improve the confidence in the determination. For example, an image including a barcode on product packaging will often include at least a small portion of the packaging surrounding the barcode. This can include at least colors or patterns present on the packaging. In embodiments where two or more objects are identified, the additional information in the image can be used to attempt to identify the appropriate object. For example, if the area around the barcode in the image is red and one of the matching objects has red packaging, then that object can be selected as the appropriate object (or the confidence in that object can at least be increased). Other elements present in the image can be used as well, such as logos, text, pictures, and the like. Portions outside the barcode can potentially be compared against images of the identified objects using an image matching process to identify images with matching features, feature points, feature vectors, or other such aspects, and an appropriate confidence score generated based at least in part upon the match or similarity. If three-dimensional information is available, such as from a stereoscopic camera, the size of the barcode or object can also be used to identify the object. If a significant portion of the object is represented in the image data, a conventional image matching process can be used as well if the barcode matching process does not yield results with sufficient confidence.

Various other types of information can be used to attempt to improve the confidence in one of the identified objects. For example, an entity such as a provider of an electronic marketplace can utilize information such as past user purchase history, browse/view data, or other such information to determine which item is more likely of interest to the user. For example, if the user has previously purchased one of the objects then it can be more likely that the user is scanning that item for updated information. Similarly, if the user has previously purchased items from a source such as ACME that uses its own barcode data, then it can be more likely that the user is interested in an ACME product. If the user has previously (or even recently) browsed products of a similar type, then that can be indicative of interest. If there is no record of a user being in an ACME or shopping for ACME products, and the user does not live near an ACME, then there can be very little likelihood that the user is scanning an ACME object. While none of these factors is dispositive, they can adjust the confidence in a particular object accordingly. These types of data can also be tracked by, for example, device or user identifier. As an example, a single user might have multiple devices and it can be desirable to aggregate information from across those devices. Similarly, there might be multiple persons (i.e., family members) who use a given device, or set of devices, and it can be desirable to aggregate data across those users, as one of those persons might typically view or purchase items of a particular type or brand, etc.

Some embodiments can utilize data for other users as well. For example, if other users frequently scan ACME items in a general geographic location, or time of day, then that can be indicative of the object being scanned. A type of location can also be used, such as a sporting item being available in a sporting goods store and a food item being available in a grocery store. Similarly, if other users scan items of a similar type at that location, then that can be indicative of the object of interest. If no other users have scanned an ACME object at or near that location, then the confidence in that match can be adjusted accordingly. If other users have not scanned a first object during a recent period of time, but have only scanned a second object, that can be indicative that the barcode is no longer associated with the first object and can increase the confidence in the second object as a match.

In some embodiments user profiling can be used to attempt to determine the appropriate match. For example, a first shopper might always shop for designer items at full price while a second shopper might often purchase items that are on sale or from budget sources. If the objects can be so differentiated, then that can be used to attempt to identify the object of interest. Similarly, if a user can be matched with a group of similar users who have purchased similar items or share similar characteristics, then the scans of those similar users can be used to determine which object is more likely of interest to the current user based at least in part upon the user's inclusion in that group. Devices can similarly be grouped into device groups for purposes such as data aggregation and profiling and discussed and suggested elsewhere herein. Profiling approaches, as well as location and other approaches discussed herein, can be used in other situations as well where more than one potential match or corresponding object is determined and there is an attempt to identify the proper object or source, etc. Any other information that can be indicative of a particular product can be used as well, such as popularity of certain products, number of scans around certain events (holidays, commercials, etc), sales or discounts, and the like.

Figure 5A:
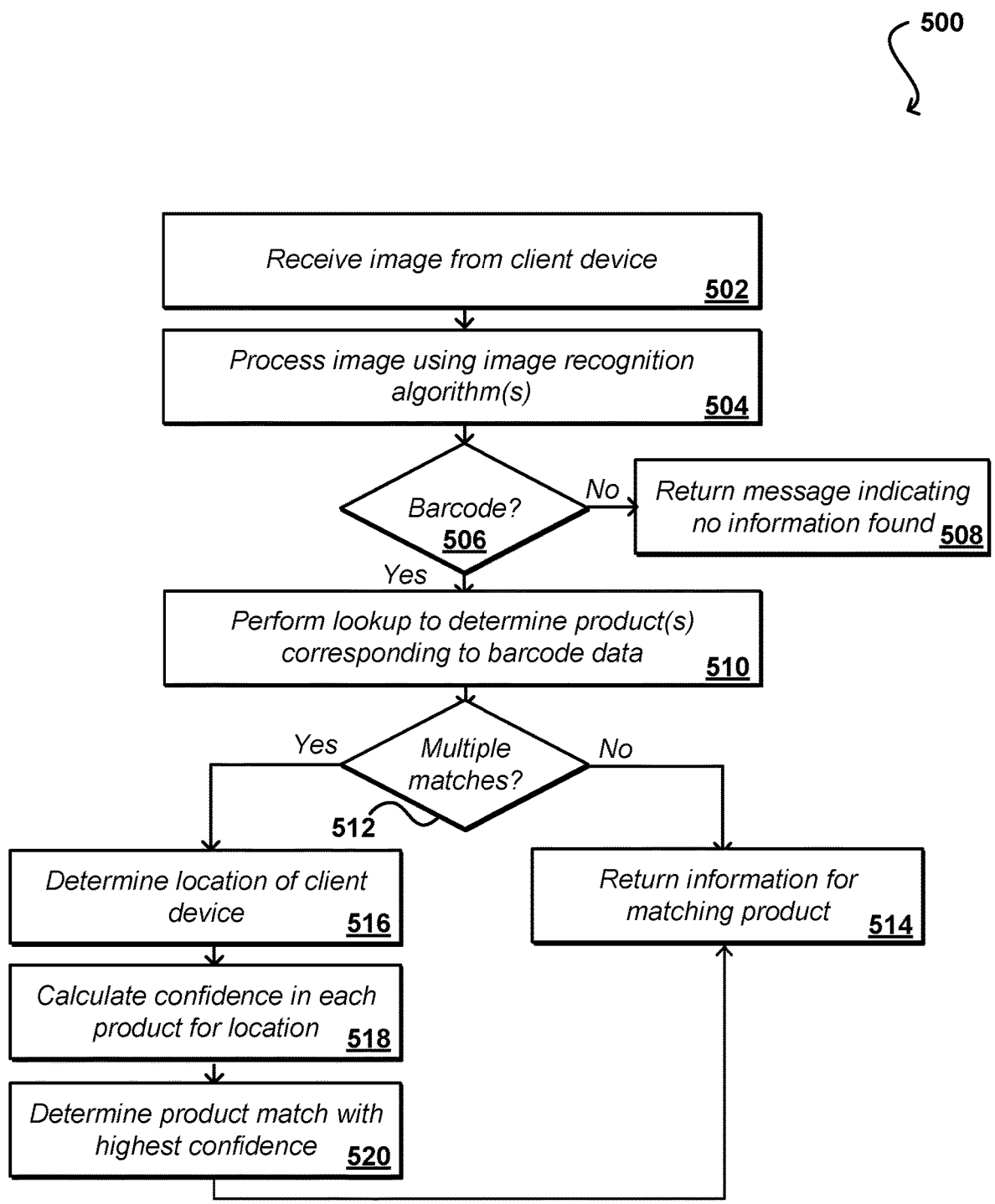
FIGS. 5A and 5B illustrate example processes for using position information to determine an item corresponding to a barcode that can be utilized in accordance with various embodiments.

FIG. 5A illustrates an example process 500 for determining an object of interest using barcode and position data that can be used in accordance with various embodiments. It should be understood that there can be additional, fewer, or alternative steps performed in similar or alternative orders, or in parallel, within the scope of the various embodiments unless otherwise stated. In this example, an image is received 502 from a client device. This image can have been captured using a camera of the computing device and uploaded from an application executing on the client device, or otherwise obtained. In at least some embodiments the application will instruct a user to position the camera such that a barcode of an object of interest is represented in the image data captured by the camera, and at least a portion of that image data can be provided with the request, call, or other transfer.

The image data can be processed 504 using one or more image recognition algorithms, as may include pattern or feature recognition algorithms, among others discussed herein. The image can be analyzed to determine whether any portion of the image appears to contain a barcode or similar encoding or identifier. For barcodes, this can include at least determining whether a portion of the image data corresponds to a set of parallel lines of relative widths, spacings, and thicknesses consistent with a barcode standard. The determination can also look for the corresponding alphanumeric character string, and can include OCR or other analysis to ensure that the string matches an appropriate barcode format, among other such options. If it is determined 506 that the image does not contain a barcode, or other such encoding, or at least that such an encoding cannot be identified from the submitted image data, then a message indicating that no information could be found (or other such message) can be returned 508 to the client device.

If a representation of a barcode or other identifier or encoding is located in the image data, a lookup can be performed 510 to attempt to determine one or more products that correspond to the barcode data. This can include, for example, determining an identifier from the bar code and executing a search query against one or more data repositories using the identifier as a query term. If only a single match is located, which corresponds to a specific product or other object, then information for that object can be returned 514 in for presentation via the client device. This can include, for example, returning information such as object name, title, pricing, reviews, photos, marketing material, and other such content.

If multiple matches are determined 512 to correspond to the identifier, then the process can attempt to determine the most likely match or otherwise improve the accuracy in the confidence scores for each match. In this example, there might initially be a confidence score from the lookup. Since the identifier might be taken from an image using image analysis, there is some opportunity for the identifier to be incorrectly determined from an OCR or other such process. Therefore, there might be a set of potential matches with associated confidence scores. In other embodiments only exact matches for the identifier might be returned for consideration, with or without a confidence score. An attempt can be made to analyze additional information in order to improve the confidence scores and determine which of the matching objects likely corresponds to the submitted image.

In this example the location of the client device at, or around, the time of the request can be determined 516. This can include the time at which the image was captured, the time at which the request was sent, or another appropriate time. The location can be determined in any of a number of different ways as discussed and suggested herein. For example, location information might be included as metadata with the image data or request. Image data might also be available from the device or a system or service in communication with the device. This data can include, for example, GPS data, cell signal triangulation data, Wi-Fi connection data, and the like. As mentioned, the location can be compared against location data relevant to the located matching object. This can include, for example, the locations of sources of those objects, locations where those objects can be found, locations where other users have submitted requests for those objects, and the like. Based at least in part upon the location data, a confidence score can be generated or updated for each of those products. For example, if the location is in a store selling only one of the products then the confidence score for that object might be near 100%. The confidence scores can be generated individually for each object, or can be calculated together such that the overall confidence score sums to 100%, among other such options. In this example, the object with the highest calculated confidence score can be determined 520, and information for that product returned for presentation on the client device.

Figure 5B:
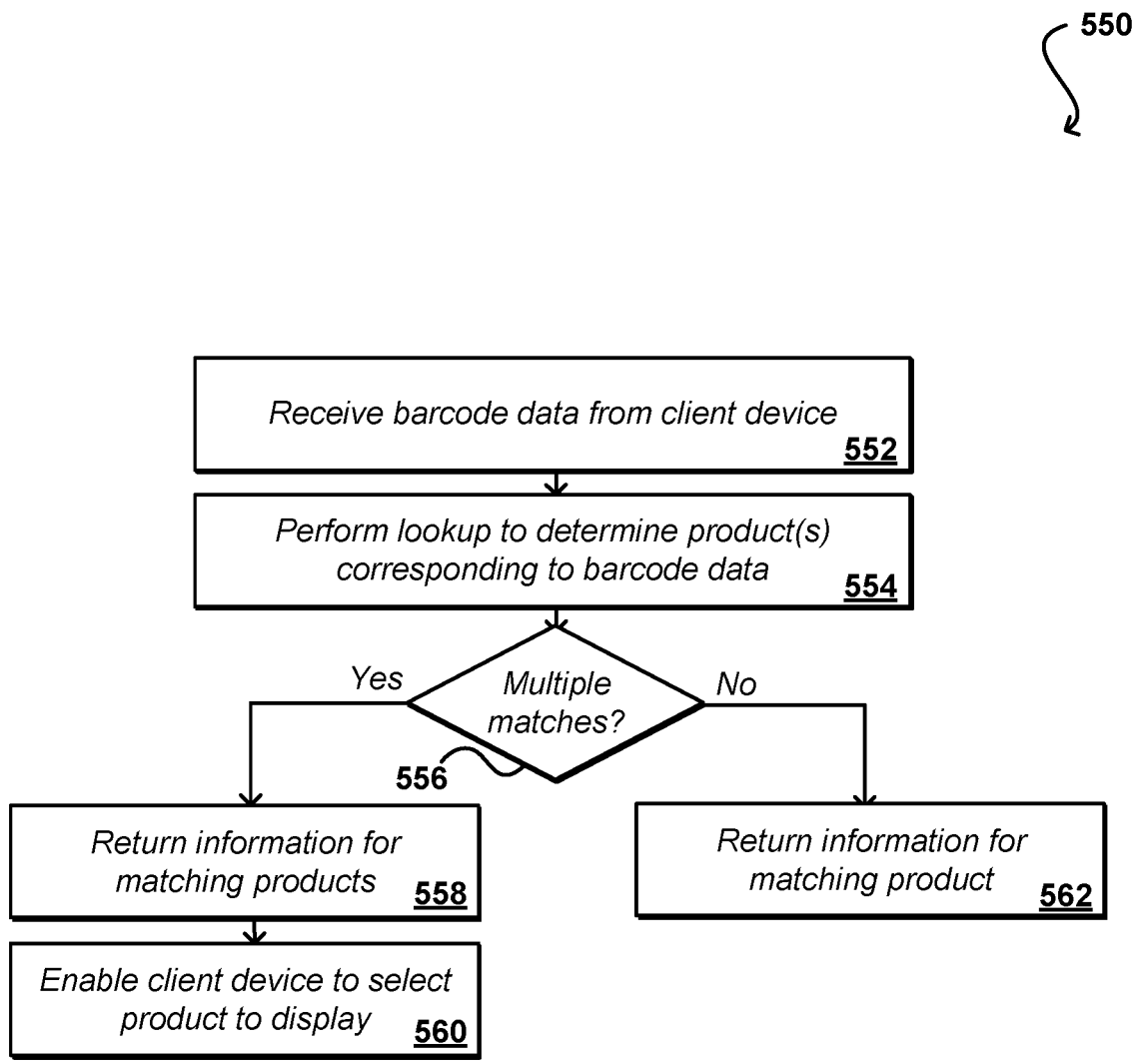

In various embodiments, at least some of the processing can be performed on the client device or a third party service, among other such options. For example, FIG. 5B illustrates an example process 550 similar to that described with respect to FIG. 5A, but where the image analysis and match selection are performed on the client device. In this example, instead of a service provider system receiving image data, an image captured by a camera of a client device can be analyzed on the client to locate and decode the barcode identifier. If a barcode identifier is able to be determined from the image data (or scanner, etc.), then the client device can transmit the barcode data which can be received 552 by the service provider system. A lookup can be performed 554 using the barcode data to attempt to determine one or more corresponding products. A determination can be made 556 as to whether one or more products match, or otherwise correspond to, the barcode identifier. If only a single match is located, which corresponds to a specific product or other object, then information for that object can be returned 562 for presentation via the client device. This can include, for example, returning information such as object name, title, pricing, reviews, photos, marketing material, and other such content.

If multiple matches are determined 556 to correspond to the identifier, information for some or all of the matching items can be returned 558 to the client device, whereby the client device can be enabled 560 to select the appropriate product(s) for which to display information. As mentioned, the client device can attempt to determine the most likely match or otherwise improve the accuracy in the confidence scores for each match. In this example the location of the client device at, or around, the time of the request can be determined. This can include the time at which the image was captured, the time at which the request was sent, the current time, or another appropriate time. The location can be determined by the client device in any of a number of different ways as discussed and suggested herein. As mentioned, the location can be compared against location data relevant to the located matching objects. Based at least in part upon the location data, a confidence score can be generated or updated for each of those products. In this example, the object with the highest calculated confidence score can be determined on the client device, and information for that product presented on the client device.

Figure 6:
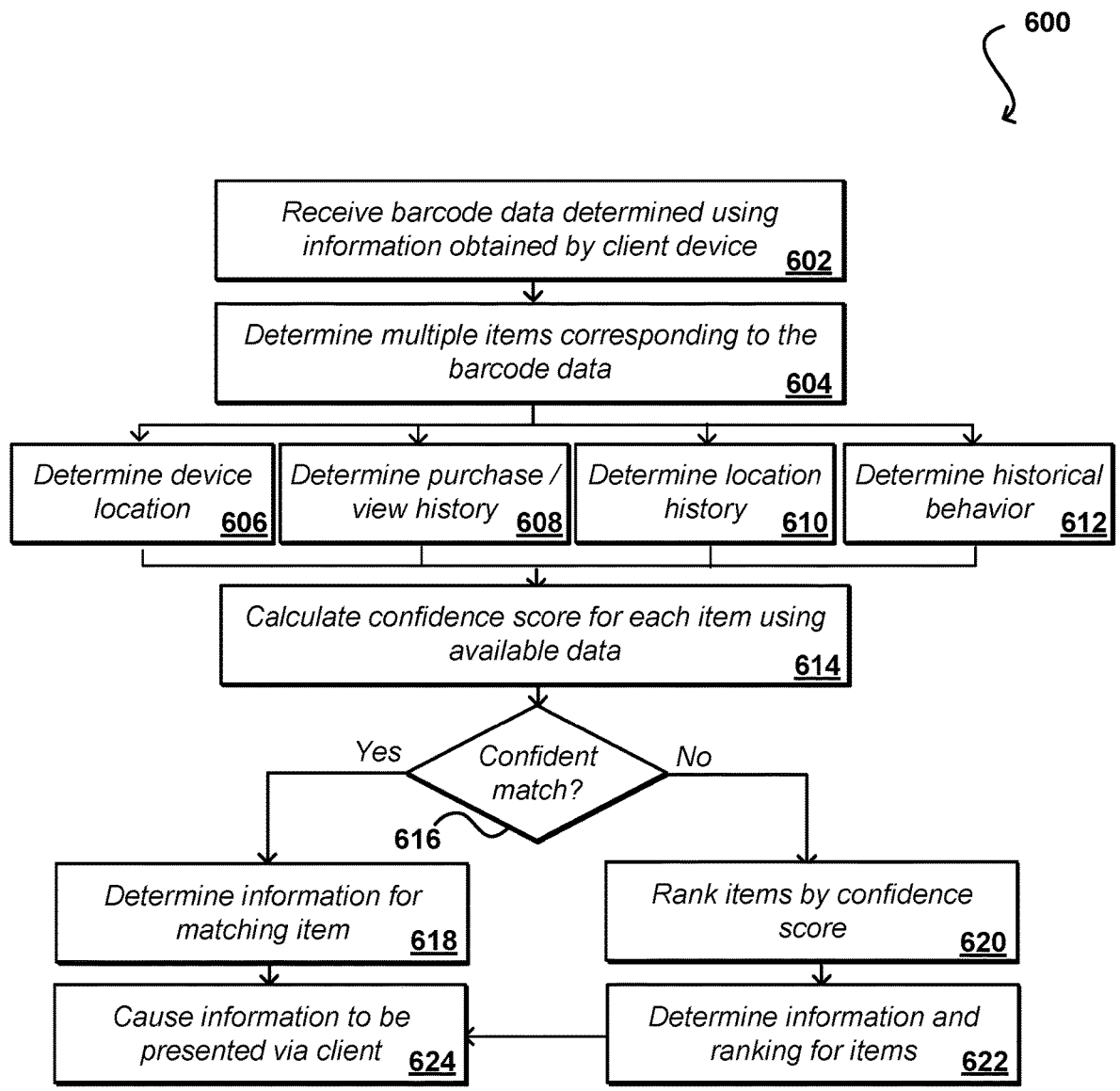
FIG. 6 illustrates an example process for using available information to determine confidence scores for items matching a barcode that can be utilized in accordance with various embodiments.

FIG. 6 illustrates another example process 600 for determining an object corresponding to a barcode, or other such encoding or identifier, that can be utilized in accordance with various embodiments. In this example, barcode data is received 602 (or otherwise obtained) that was obtained by a client device or other such source. The barcode data can be included in image data captured by the client device or a barcode identifier determined from such data, among other such options. For example, the barcode could have been obtained from an image captured by a camera of the client device, where the image was analyzed on or off the device. The identifier of the barcode, once determined, can then be used to search for objects associated with that identifier. In this example multiple items are determined 604, from one or more data sources, that correspond to the barcode data. As part of the determination, there may or may not be a confidence score generated based on the barcode data and/or the OCR process, etc. If this confidence score at least meets a specified confidence threshold, then that object can be selected as the matching object.

In this example, however, multiple objects matching the barcode are identified without any of the objects satisfying the confidence threshold. It therefore can be desirable to look to additional available data to attempt to improve the confidence values for each object to identify the correct object. There can be various types of data analyzed from multiple sources and in varying combinations, but this example looks to four types of data. The analysis can be done sequentially or in parallel, in whole or in part. In this example the device location can be determined 606 as discussed with respect to the process of FIG. 5. The device location can be used to determine whether the device is near a place where any of the objects are likely to be found, have been found in the past, etc. The purchase, viewing, or other history of a user associated with the client device can be determined 608 as well. For example, if the user has purchased or shown an interest in one of the objects, then that object can be more likely to be the subject of the request. In this example a history location can be determined 610 for the user and/or device as well. If the position of the device and/or user was previously determined to be at or near a location where one of the objects can be found, then this can be indicative of the object being the subject of the request. This can be the case where, for example, the user was previously in a store that sold that type of object, and the user is now scanning an item in the user's home. Another type of data that can be analyzed in this example includes historical behavior 612. This can include, for example, types of things the user has searched, prior actions taken by the user, patterns of behavior exhibited, and any other type of behavior data that might be useful in determining the appropriate item.

Based at least in part upon this available data, a confidence sore (or updated confidence score) can be calculated 614 for each item. In some embodiments, a barcode identifier algorithm might produce an algorithm with a certain confidence value, and an identifier match process might provide another confidence value. A function can take in these confidence values and confidence factors from the available data to attempt to determine an overall confidence score for each item. Each of these factors can be weighted by a different amount, which in some embodiments can be learned or updated using a computer learning or other such training process. Using the resulting confidence scores, a determination can be made 616 as to whether one of the objects is determined to be a confident match, or an object having at least a minimum confidence score with respect to the query. If so, that item can be determined to be the appropriate match and information for the matching item can be determined 618 or otherwise identified for presentation in response to the query. The information can then be caused 624 to be displayed by the client device or another identified device. If no single object has at least the minimum confidence score, then at least some of the objects can be ranked 620 by confidence score and information for at least some of the matching items returned 622 for presentation by the client. Various other selection and display criteria can be used as well within the scope of the various embodiments.

Figure 7:
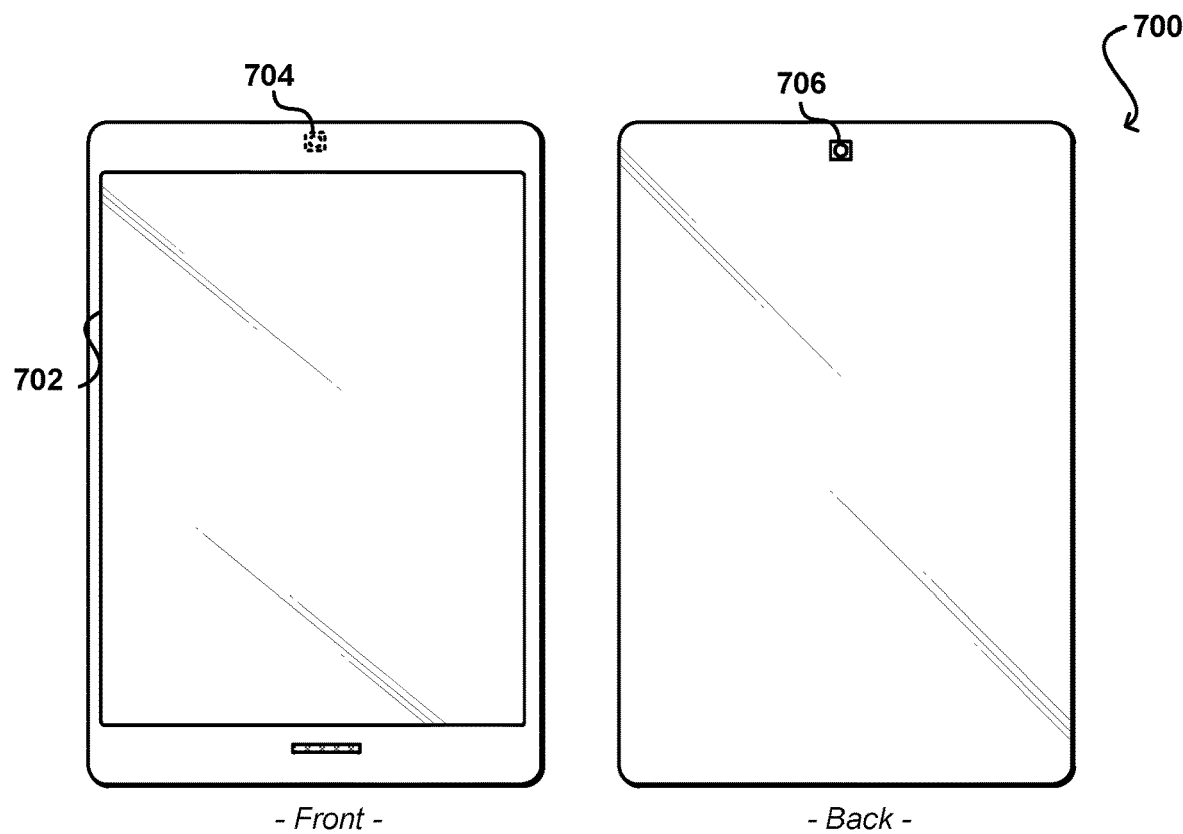
FIG. 7 illustrates front and back views of an example device that can be used in accordance with various embodiments.

FIG. 7 illustrates an example of a computing device 700 that can be used in accordance with various embodiments.

Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702, which under normal operation will display information to a user facing the display screen (e.g., on the same side of the computing device as the display screen). The computing device in this example can include one or more image capture elements, in this example including one image capture element 704 on the back side of the device, although it should be understood that image capture elements could also, or alternatively, be placed on the sides or corners of the device, and that there can be any appropriate number of capture elements of similar or different types. Each image capture element 704 may be, for example, a camera, a charge-coupled device (CCD), a motion detection sensor, or an infrared sensor, or can utilize any other appropriate image capturing technology. The computing device can also include at least one microphone or other audio capture element(s) capable of capturing other types of input data, as known in the art, and can include at least one orientation-determining element that can be used to detect changes in position and/or orientation of the device. Various other types of input can be utilized as well as known in the art for use with such devices.

Figure 8:
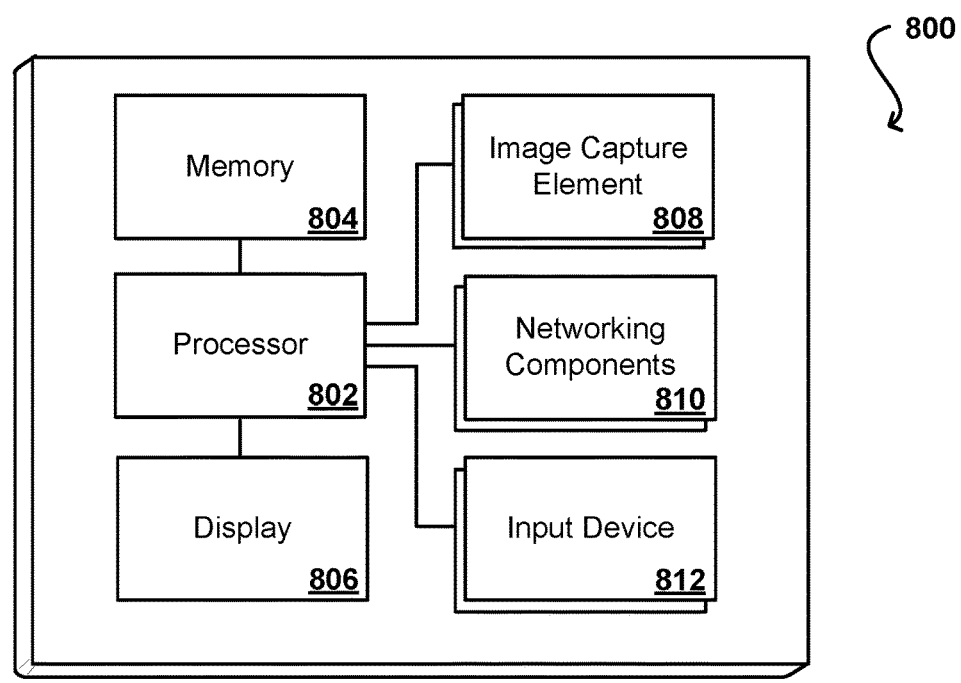
FIG. 8 illustrates an example configuration of components of a device such as that described with respect to FIG. 7.

FIG. 8 illustrates a set of basic components of a computing device 800 such as the device 700 described with respect to FIG. 7. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the processor 802, the same or separate storage can be used for images or data, a removable memory can be available for sharing information with other devices, and any number of communication approaches can be available for sharing with other devices. The device typically will include some type of display element 806, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 808, such as at least one ambient light camera that is able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include one or more networking components 810 enabling the device to communicate with remote systems or services such as content providers and rights determining systems. These components can include, for example, wired or wireless communication components operable to communicate over a network such as a cellular network, local area network, or the Internet. The device can also include at least one additional input device 812 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a two-dimensional (2D) code from an image including a representation of an object at a specific physical location using a computing device, both the object and the computing device being at the specific physical location;
   determining two or more objects, of different object types, each associated with the same 2D code, the object types representing specific products for purchase;
   determining additional data associated with at least one of the specific physical location, the computing device, or a user of the computing device;
   identifying, based at least in part upon the additional data, a selected object of the two or more objects to correspond to the object represented in the image; and
   providing, for display on the computing device, information pertaining to the selected object.

2. The computer-implemented method of claim 1, wherein the representation of the object is contained within image data captured by a camera of the computing device, and further comprising:
   determining, from the image data, an image region corresponding to the 2D code; and
   determining the 2D code from the image region.

3. The computer-implemented method of claim 2, wherein the 2D code is represented on the object through a bar code, a QR code, a watermark, or product packaging.

4. The computer-implemented method of claim 1, wherein the additional data includes location data indicating the specific physical location, and further comprising:
   determining, for each respective object of the two or more objects and based at least in part upon the location data, a respective confidence score indicating a likelihood of a respective object being available at the specific physical location;
   determining that the respective confidence score for a first object of the two or more objects at least meets a minimum confidence threshold; and
   selecting the first object as the selected object.

5. The computer-implemented method of claim 4, wherein the location data is obtained using at least one of a global positioning system (GPS) component of the computing device, a network connection, signal triangulation, or a detected nearby device.

6. The computer-implemented method of claim 1, wherein the additional data includes location data indicating the specific physical location, and further comprising:
   determining, for each respective object of the two or more objects and based at least in part upon the location data, a respective confidence score indicating a likelihood of a respective object being available at the specific physical location;
   determining that the respective confidence score for neither a first object nor a second object of the two or more objects at least meets a minimum confidence threshold; and
   providing, for display on the computing device, information for both the first object and the second object.

7. The computer-implemented method of claim 6, further comprising:
   ranking the first object and the second object by the respective confidence scores before providing the information for display.

8. The computer-implemented method of claim 1, wherein the additional data includes at least one of historical location data, purchase history, viewing history, user profile data, user preference data, group data, other objects identified near the specific physical location, or external appearance data for the object.

9. The computer-implemented method of claim 1, wherein a first object of the two or more objects is from a first source having registered the 2D code with a identifying entity, and wherein a second object of the two or more objects is from a second source that maintains its own 2D codes.

10. The computer-implemented method of claim 1, further comprising:
executing a search query against at least one search repository, the search query including the 2D code; and
receiving, from the at least one search repository, identifying information for the two or more objects.

11. A system, comprising:
at least one processor; and
memory storing instructions that, when executed by the at least one processor, cause the system to:
receive, from a computing device, a representation of an identifying encoding being encoded onto an object, at a specific physical location, using an optical machine-readable encoding, both the object and the computing device being at the specific physical location;
determine two or more objects, of different object types, each associated with the same identifying encoding, the object types representing specific products for purchase;
determine additional data associated with at least one of the specific physical location of the object, the computing device having captured the representation, or a user of the computing device;
identify, based at least in part upon the additional data, a selected object of the two or more objects to correspond to the object from which the representation of the identifying encoding was obtained; and
provide, for display on the computing device, information pertaining to the selected object.

12. The system of claim 11, wherein the representation of the object is contained within image data captured by a camera of the computing device, and wherein the instructions when executed further cause the system to:
determine, from the image data, an image region corresponding to the identifying encoding; and
determine the identifying encoding from the image region using at least one image recognition algorithm.

13. The system of claim 11, wherein the instructions when executed further cause the system to:
determine, for each respective object of the two or more objects and based at least in part upon the location of each object, a respective confidence score indicating a likelihood of a respective object being available at the location;
determine that the respective confidence score for a first object of the two or more objects at least meets a minimum confidence threshold; and
select the first object as the selected object.

14. The system of claim 13, wherein the location data is obtained using at least one of a global positioning system (GPS) component of the computing device, a network connection, signal triangulation, or a detected nearby device.

15. The system of claim 11, wherein the instructions when executed further cause the system to:
determine, for each respective object of the two or more objects and based at least in part upon the location data, a respective confidence score indicating a likelihood of a respective object being available at the specific physical location;
determine that the respective confidence score for neither a first object nor a second object of the two or more objects at least meets a minimum confidence threshold; and
provide, for display on the computing device, information for both the first object and the second object, the first object and the second object being ranked by the respective confidence scores before providing the information for display.

16. The system of claim 11, wherein the additional data includes at least one of historical location data, purchase history, viewing history, user profile data, user preference data, other objects identified near the specific physical location, or external appearance data for the object.

17. A non-transitory computer-readable storage medium storing instructions that, when executed by a processor of a computing device, cause the computing device to:
receive a two-dimensional (2D) code from an image including a representation of an object at a specific physical location using a computing device, both the object and the computing device being at the specific physical location;
determine two or more objects, of different object types, each associated with the same 2D code, the object types representing specific products for purchase;
determine additional data associated with at least one of the specific physical location, the computing device, or a user of the computing device;
identify, based at least in part upon the additional data, a selected object of the two or more objects to correspond to the object represented in the image; and
provide, for display on the computing device, information pertaining to the selected object.

18. The non-transitory computer-readable storage medium of claim 17, wherein the representation of the object is contained within image data captured by a camera of the computing device, and wherein the instructions when executed further cause the computing device to:
determine, from the image data, an image region corresponding to the 2D code; and
determine the 2D code from the image region.

19. The non-transitory computer-readable storage medium of claim 18, wherein the 2D code is represented on the object through a bar code, a QR code, a watermark, or product packaging.

20. The non-transitory computer-readable storage medium of claim 17, wherein the additional data includes location data indicating the specific physical location, and wherein the instructions when executed further cause the computing device to:
determine, for each respective object of the two or more objects and based at least in part upon the location data, a respective confidence score indicating a likelihood of a respective object being available at the specific physical location;
determine that the respective confidence score for a first object of the two or more objects at least meets a minimum confidence threshold; and
select the first object as the selected object.

* * * * *